United States Patent [19]

Ohtsubo et al.

[11] Patent Number: 5,000,760
[45] Date of Patent: Mar. 19, 1991

[54] CBN ABRASIVE-GRAINS, METHOD FOR PRODUCING THE SAME, AND GRINDING WHEEL

[75] Inventors: Hirohiko Ohtsubo; Masakazu Maki; Eiichi Iizuka, all of Shiojiri, Japan

[73] Assignee: Showa Denka K.K., Tokyo, Japan

[21] Appl. No.: 382,877

[22] Filed: Jul. 21, 1989

[30] Foreign Application Priority Data

Jul. 22, 1988 [JP] Japan .................................. 63-181669
Jul. 27, 1988 [JP] Japan .................................. 63-185464

[51] Int. Cl.$^5$ ............................................. B24D 3/00
[52] U.S. Cl. ........................................ 51/293; 51/295; 51/307; 51/308; 51/309
[58] Field of Search .................. 51/293, 295, 307, 308, 51/309

[56] References Cited

U.S. PATENT DOCUMENTS

| | | | |
|---|---|---|---|
| 4,259,090 | 3/1981 | Bovenkerk | 51/309 |
| 4,512,946 | 4/1985 | Brun et al. | 51/307 |
| 4,515,746 | 5/1985 | Brun et al. | 51/307 |
| 4,518,659 | 5/1985 | Gigl et al. | 51/307 |
| 4,539,141 | 9/1985 | Brun et al. | 51/309 |

FOREIGN PATENT DOCUMENTS 199514 11/1984 Japan .
17405 1/1986 Japan .

Primary Examiner—William R. Dixon, Jr.
Assistant Examiner—W. J. Thompson
Attorney, Agent, or Firm—Sughrue, Mion, Zinn, Macpeak & Seas

[57] ABSTRACT

CBN abrasive grains contain 0.01% by weight or more of Si and, the majority of the surfaces of its grains consist of {111} planes. In the method for producing CBN abrasive grains, a C source, an Si source, and at least one member selected from the group consisting of alkali hydride, alkali-earth hydride, and a synthetizing catalyst of CBN which may be the alkali hydride and alkali-earth hydride, are mixed together with HBN and are subjected to the treatment.

30 Claims, 2 Drawing Sheets

CBN ABRASIVE-GRAINS, METHOD FOR PRODUCING THE SAME, AND GRINDING WHEEL

BACKGROUND OF INVENTION

1. Field of Invention

The present invention relates to an abrasive made of cubic boron-nitride, a method for producing the same, and a grinding wheel made of the same abrasive.

2. Description of Related Arts

Cubic boron nitride (hereinafter referred to as CBN) is produced by means of treating hexagonal boron nitride (hereinafter referred to as HBN) under a high-temperature and pressure condition where CBN is thermodynamically stable. CBN has the highest degree of hardness, after diamonds. The chemical stability of CBN, particularly the stability relative to the ferrous materials to be machined, is superior to that of diamonds. The amount of CBN used as an abrasive is therefore increasing.

Various proposals for producing CBN particles are made in Japanese Unexamined Patent Publications Nos. 59-57905, 59-73410, and 59-73411. The CBN particles produced by these general methods can be used on general, electro-plated grinding wheels or on metal-bonded grinding wheels, without problem, except in cases where cutting quality is specifically required.

The CBN particles for these applications should be dense, transparent, and have sharp cutting edges and high crushing strength.

The present applicant proposed, in Japanese Unexamined Patent Publication No. 61-31306, a method for producing CBN, in which $LiMBN_2$ (M is alkali earth metal) and $Ca_5Si_2N_6$ are used as the catalysts. According to this method, a trace amount of Si in the catalysts is incorporated into the CBN, thereby leading to the progress of $\{111\}$ of the crystals, and sharpening the corners of CBN particles. As a result, the properties of CBN as abrasive particles are improved.

The present applicant also proposed, in Japanese Unexamined Patent Publication No. 61-17405, to use $LiMBH_2$ (M is alkali earth metal) and $Li_8SiN_4$ as the catalysts, thereby incorporating Si into the CBN particles and sharpening the corners of CBN particles.

The present inventors researched the outer planes of the CBN particles which were produced by the methods of Japanese Unexamined Patent Publication Nos. 61-31306 and 61-17405. The discoveries thereby obtained are as follows. The fundamental, outer constitutional planes of CBN particles are eight $\{111\}$ planes. However, in most of the outer planes, $\{111\}$ planes do not intersect with one another, but $\{100\}$ planes and $\{111\}$ planes intersect with one another. As a result, the CBN particles do not possess the sharp edges of $\{111\}$ polygons.

SUMMARY OF THE INVENTION

It is an object of the present invention to eliminate the drawbacks described and to provide CBN particles which have sharper corners than and superior abrasive properties to the conventional CBN particles.

It is another object of the present invention to provide a method for producing the CBN particles described above.

It is a further object of the present invention to provide a CBN abrasive grinding wheel having improved grinding performance.

The present inventors discovered that the habit planes of CBN become rich in $\{111\}$ by means of containing 0.01 % by weight or more (percentage is hereinafter weight %, unless otherwise specified) of Si and using a specified production method.

Although there are previous proposals for using Si-containing catalysts and incorporation Si from it into CBN, $\{111\}$ planes cannot be increased by these methods. These methods are therefore not effective in forming sharp edge lines on the CBN particles.

One method for producing the CBN abrasive grains according o to the present invention resides in that a C source, an Si source, and at least one member selected from the group consisting of an alkali hydride or alkali-earth hydride, along with a synthesizing catalyst of CBN, which may be an alkali hydride or alkali-earth hydride, are mixed together with HBN and are treated under high temperature and high pressure. This method can be embodied as follows.

(1) A C source, an Si source, and an alkali hydride or alkali-earth hydride are, along with a synthesizing catalyst of CBN which is neither an alkali hydride nor alkali-earth hydride, are mixed together with HBN and are treated under high temperature and high pressure.

(2) A C source, an Si source, and one member selected from the group consisting of an alkali hydride, alkali-earth hydride, a synthesizing catalyst of CBN which is neither said alkali hydride nor alkali-earth hydride, are mixed together with HBN and are treated under high temperature and high pressure.

(3) A C source, an Si source, an alkali hydride and/or an alkali-earth hydride, and a synthesizing catalyst of CBN, are mixed together with HBN, and are treated under high-temperature and high-pressure.

Another method for producing the CBN abrasive grains according to the present invention resides in that an Si source, an alkali hydride or alkali-earth hydride, and a synthesizing catalyst of CBN are mixed together with HBN and are treated under high temperature and high pressure.

In a grinding wheel, according to the present invention CBN abrasive grains, which contain 0.01 % by weight or more of Si and surfaces of whose majority grains consist of $\{111\}$ planes, are bonded with each other and onto a wheel body by means of a binder or by electro-plating method. The binder may be metal, ceramic, glass or resin. The CBN abrasive grains may be coated with Ni and bonded by a resin binder.

The present invention is hereinafter described with reference to the drawings.

DESCRIPTION OF PREFERRED EMBODIMENTS

The {111} planes appear on CBN which may be a general one or one to which Si may be incorporated. However, other planes also appear on such CBN, with the result that that {111} planes do not directly intersect with one another.

Figure 3:
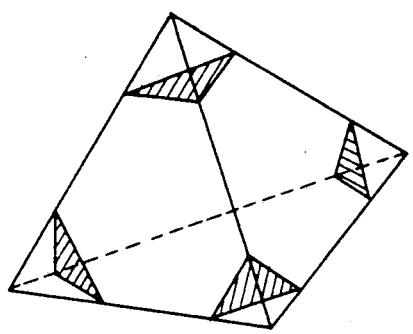
FIG. 3 shows a CBN tetrahedron constituted by four $\{111\}$ planes.
Figure 4:
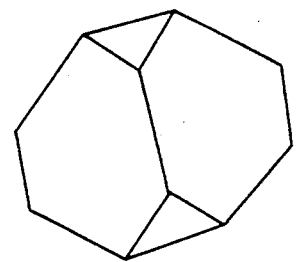
FIG. 4 shows a CBN octahedron which is formed by cutting every apexes of the tetrahedron.

CBN is a polar crystal of the B atoms and N atoms. There are {111} planes of the B atoms and {111} planes of N atoms. When the number of {111} planes of B atoms is equal to that of N atoms on, a CBN crystal, a CBN crystal in the form of a normal octahedron in formed. The CBN crystal shown in FIG. 4 is such an octahedron that a tetrahedron shown in FIG. 3 is cut at the four apexes by {111} planes. This is the fundamental form of a CBN crystal according to the present invention.

Figure 5:
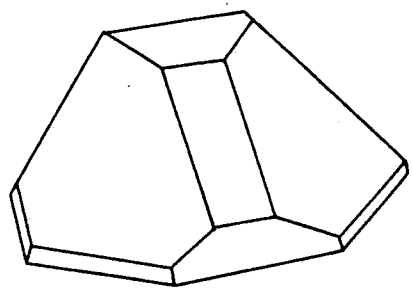
FIG. 5 shows a CBN crystal which is formed by cutting parts of an octahedron by $\{111\}$ planes.

As is shown in FIG. 5, when {100} planes appear between the {111} planes and rim the edges of the {111} planes, the CBN crystal formed has a conventional shape. Contrary to this, according to the present invention, Si atoms incorporated into CBN during its growth promote growth of the {111} planes and suppress growth of the {100} planes.

The number of crystals constituted only by the {111} planes and their twin crystals is 50 % or more relative to the number of the abrasive grains prepared by the embodiment (1) as described above.

Figure 1:
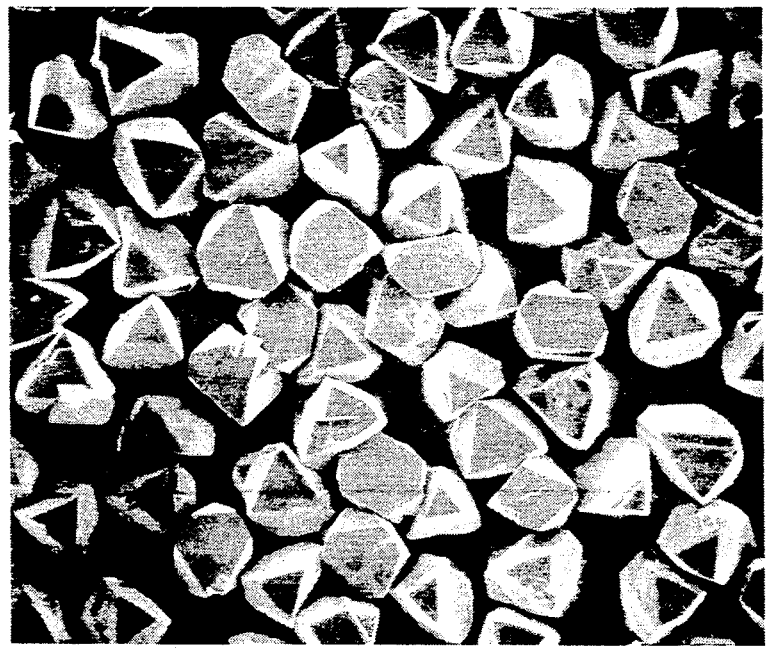
FIG. 1 is an electron-microscopic photograph showing the CBN abrasive grains according to the present invention.

FIG. 1 shows at magnification of 75 times, several of the CBN particles produced in one batch of Example 1 described hereinafter. As is apparent from this photograph, a number of triangular planes and edges of pyramid appear.

Figure 2:
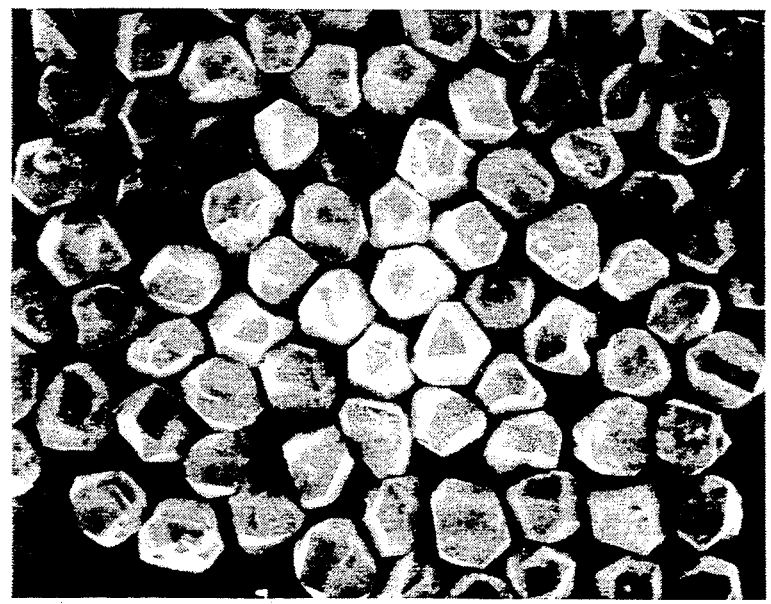
FIG. 2 is an electron-microscopic photograph showing conventional CBN abrasive grains.

FIG. 2 shows the shapes of conventional CBN particles, into which Si is incorporated according to the method of Japanese Unexamined Patent Publication No. 61-31306. Although sharp edges appear on these CBN particles, they are generally roundish, and hence their outer shape is fundamentally different from that of the present invention.

Presumably, reasons for the disappearance of sharp edges of the CBN abrasive grains obtained by the conventional methods resides in that abnormal matters, such as $B_2O_3$, are present in the synthetic system and impede the crystal growth process in such a manner that the growth in a parallel direction to the {111} planes is relatively hindered, while the growth in a direction perpendicular to the {111} planes is relatively promoted. As a result, {100} planes appear between the {111} planes. Therefore, in order to synthesize the CBN abrasive grains having sharp cutting edges, it seems necessary to exclude the influence of the whole synthesizing system, particularly any oxides, upon the CBN during crystal growth.

The present inventors tried to add a C source in the raw material so as to reduce and decompose oxidic matters, such as $B_2O_3$ under a high-temperature and high-pressure condition at the synthesizing of CBN, and to exclude or decrease their influence upon the growth. As a result, a CBN crystal, which is rich in {111} planes and has sharp lines of edges and corners is developed.

The present applicant proposed Japanese Unexamined Publication No.58-120505, in which a C source, such as graphite is mixed with HBN and the thus prepared raw material is treated under high temperature and high pressure. On the contrary, in the present invention, the C source and Si source are combined, and this combination enables one to obtain a CBN crystal, in which the {111} planes are thoroughly developed and are directly in contact with each other along the edges lines.

The alkali hydride and alkali earth hydride enables synthesizing of a clean CBN crystal, whose defects are few and which has a transparent appearance. Alkali hydride and alkali earth hydride also act as a catalyst and as a purifying agent for obtaining a crystal having few defects and high strength. Alkali hydride and alkali earth hydride also enhance the function of Si.

The method of embodiment (1) mentioned hereinabove produces the CBN abrasive grains shown in FIG. 1.

The methods of embodiment (2) and (3) results in CBN grains, whose direct intersections of {111} planes are fewer than that shown in FIG. 1, but whose abrasive properties are superior to the conventional CBN grains.

The components of the raw material used according to the present invention are further described.

Si incorporated in the CRN according to the present invention increases the lattice constant of CBN and enhances its strength. A preferred ratio of Si content in the light of strength is 0.01 % or more. When the Si content exceeds 1.0 %, however, Si is contained in the CBN crystal as macroscopic defects and lowers its strength. A preferred Si content is therefore from 0.01 to 1.0 %.

HBN with a purity rate of 95 % or more invariably results in CBN having the desirable shape of apexes. Fatty acids such as stearinic acid and palmitinic acid, hydrocarbons such as docosane ($CH_3(CH)_{20}CH_3$) and terphenyl, nitrogen-containing organic compounds such as melamine and urea, or carbon in an elemental form or compound form, i.e., graphite, carbon black and $B_4C$, can be used as the C source. Of these carbon sources, rather than graphite, which is crystallized and stable, the preferred ones are those in which C is a constituent element of the compound at the time of addition and is then converted to an active form due to decomposition during the growth period of CBN. The amount of C source used is preferably limited to one mole of an incidental $B_2O_3$ which accompanies HBN as a foreign matter. The amount of C source used for HBN having ordinary purity is from 0.01 to 15% relative to the total raw materials.

Si powder, and such compounds as $B_4Si$ and $Si_3N_4$ can be used as the Si source. The Si source may be mixed with the raw materials. However, in order to increase the Si content of CBN, Si is preferably originally contained in the synthetic catalyst of CBN. Si can be contained in the synthetic catalyst of CBN by heating and melting the Si source and catalyst. The amount of Si source used is preferably from $10^{-5}$–$10^{-2}$ mol relative to one mol of HBN. When this amount is less than $10^{-5}$ mol, the amount of Si incorporated in CBN is very small. On the other hand, when this amount is more than $10^{-2}$ mol, the macroscopic defects generate in CBN as described above.

LiH, NaH, $CaH_2$, $SrH_2$, and the like can be used as the alkali hydride and alkali earth hydride and act as H source. A preferred amount of the H source is from 0.1 to 10 % relative to the total raw materials.

Possible, synthesizing catalysts of CBN are: (a) alkali such as Li, Na, K, and the like, their nitrides ($Li_3N$, the like), and their double nitride ($Li_3BN_2$ or the like); (b) alkali earths such as Ca, Sr, Mg, Ba and the like, nitrides of Ca, Sr, Mg, Ba and the like, ($Ca_3N_2$, $Sr_3N_2$, $Mg_3N_2$, Ba₃N₂) and the like), double nitride (Ca₃BN₂ and the like) and, (C) complex nitrides of alkali and alkali earths (LiCaBN₂, LiBaBN₂ and the like). The synthesizing catalyst (c) is preferred because the CBN abrasive grains having desirably sharp apexes can be reliably produced. The amount of synthesizing catalyst used is preferably from 5 to 50 parts by weight relative to 100 parts by weight of HBN.

When there is much $B_2O_3$ in the HBN powder, the C source is used. Then, boron is generated according to the following formula.

$$B_2O_3 + 3C \rightarrow 2B + 3CO$$

The excess B thus formed, is undesirable in the light of CBN abrasive grains having desirably sharp apexes. It is therefore preferable to fix B as BN by adding an N source and make B non-detrimental. Melamine, urea and the like can be used as the N source. The amount used is from 0.01 to 10 parts by weight relative to the total raw materials.

The present invention is hereinafter described in detail by way of the examples.

EXAMPLE 1

HBN (Showa Denko's product UHP-1; the grain size 6-8 μm in average; purity—98%; and $B_2O_3$ content—0.5 %) in an amount of 100 parts (by weight, ditto hereinafter) was mixed with 2.65 parts of melamine ($C_3H_6N_2$) as the C source, 2 parts of LiH as alkali hydride, and 15 parts of LiCaBN₂ with 1 % of Si content therein as the synthesizing catalyst of CBN, and subsequently shaped. The obtained samples were treated under condition of 40-60 kbar and 1400°-1600 °C. It was possible to obtain the CBN particles as shown in FIG. 1 which: were yellow and transparent, exhibited triangular shapes of {111} planes; and had a number of sharp edges. The average grain diameter of the CBN particles was 130 μm, and the Si content was 0.103 %.

Approximately 870 CBN particles were subjected to photographing of SEM at magnification of 75 times and ten fields of view. The results revealed that proportions of grains having other planes than {111} was approximately 2.3 %. The planes other than {111} were mostly {100} planes.

EXAMPLE 2

The treatment under the same conditions as in Example 1 was carried out except that the melamine used in Example 1 was replaced with one part of stearinic acid —$CH_3(CH_2)_{16}COOH$—. It s was possible to obtain CBN particles which were a relatively dark, blackish brown color, and had a number of {111} planes and sharp edges as in Example 1.

EXAMPLE 3

The grain size of CBN particles obtained in Example 1 was adjusted to #120/140. Then, a grinding wheel 150 mm in outer diameter and 10 mm in thickness was prepared by means of electro-plating the adjusted CBN particles. The specifications as to the amount of C8N used and the like, was the same as SBN-T, which is a conventional product of the applicant using blocky CBN particles for a grinding wheel, and was subjected to comparison. The grinding conditions of the grinding wheels are as follows.

Wheel speed of grinding wheel—2000 m/min
Table speed—15 m/min
In feed—40 μm
Worked material—M-2 Steel Power used for grinding 60 cm³ of the worked material by the conventional grinding wheel and the grinding wheel according to the present invention were 3030 W and 2640 W, respectively. That is, the latter is less than the former by 13%.

EXAMPLE 4

Treatment under the same conditions as in Example 1 was carried out except that as Si source, 0.3 parts of B₄Si was used relative to 100 parts of HBN. CBN particles similar to those in Example 1 were obtained. The Si content was 0.109 % (1090 ppm).

EXAMPLE 5

Treatment under the same conditions as in Example 1 was carried out except that as Si source 0.3 part of metallic Si was used relative to 100 parts of HBN. CBN particles similar to those in Example 1 were obtained. The Si content was 0.128 % (1280 ppm).

EXAMPLE 6

One part of stearinic acid as the C source, 0.5 part of urea as the N source, 10 Parts of LiCaBN₂ with 1% of Si contained therein, and 4 parts cf CaH₂ relative to the 100 parts of HBN, were treated under the same high-temperature and high-pressure conditions as in Example 1. CBN particles that had no blackish color were obtained. The Si content of CBN was 970 ppm

EXAMPLE 7

Vitre-bond grinding wheels were prepared using the CBN particles of grind obtained in Example 1 and conventional CBN particles. The composition of the grinding wheels was as follows.

Grain size: #170/200
Concentration degree: 100 (ratio of abrasive grains 25 vol %)
Porosity: 30 vol %
Bond ratio: 25 vol %
Filler: White alundum (WA#220)—20 vol %
The size of the grinding wheels was 205 mmφ, 5 mmμ, and 76.2 mmH.

The CBN abrasive grains were mixed with boro-silicate glass and filler, molded into a size approximately 5 mm×3 mm×30 mm, and then fired at 950 °C. for 10 hours in an ambient atmosphere. The fired bodies were adhered onto an aluminum wheel to prepare the grind wheels.

The grinding method was: wet traversal planar grinding; wheel speed of grinding wheel—2000 m/minute; table speed—15 m/minute; cross feeding—2mm/pass; and, in feed of —20 μm. The material ground was as follows.

|  | Grinding ratio | Power (W) |
| --- | --- | --- |
| Conventional Product | 480 | 520 |
| Inventive Product | 700 | 530 |

EXAMPLE 8

HBN (Showa Denko's product UHP-1; the grain size 6-8 in average; purity—98 %; and $B_2O_3$ content—0.5 %) in an amount of 100 parts (by weight) was mixed with 2.65 parts of melamine ($C_3H_6N_2$) as the C and N source, and 15 parts of $LiCaBN_2$ with 1 % of Si content therein as the synthesizing catalyst of CBN, and was subsequently shaped. The obtained samples were treated under condition of 40–60 kbar and 1400°–1600 °C. It was possible to obtain CBN particles which were yellow and transparent. The average grain diameter and the purity of the CBN particles was 130 μm and 99.8%, respectively.

EXAMPLE 9

Treatment under the same conditions as in Example 8 was carried out except that the melamine used in Example 8 was replaced with 3 parts of LiH as the alkali hydride. It was possible to obtain CBN particles which exhibited a more remarkable transparent appearance than and similar sharp edges to those of Example 8. The average grain diameter and purity of CBN particles was 130 μm and 99.8 %, respectively.

EXAMPLE 10

Treatment under the same conditions as in Example 8 was carried out except that melamine used in Example 8 was replaced with one part of stearinic acid —$CH_3(CH_2)_{16}COOH$—.

It was possible to obtain CBN particles which exhibited a relatively dark, blackish brown color, and a number of {111} planes and sharp edges, as found in Example 8.

EXAMPLE 11

The same grinding test as in Example 3 was carried out with regard to the CBN particles obtained in Examples 8 and 9. Power used for grinding 60 cm³ of worked material was 2788W (Example 8) and 2848W (Example 9) which is a reduction of 8% and 6 %, respectively, with regard to the power of 3030W of the applicant's conventional product (SBN-T).

EXAMPLE 12

One part of stearinic acid as the C source, 0.5 parts of urea as the N source, and 10 parts of $Li_3BN_2$ with 1 % of Si contained therein, were treated under the same high-temperature and high-pressure conditions as in Example 8. CBN particles with sharp edges and with no blackish color were obtained.

EXAMPLE 13

One part of docosane as the C source, 0.5 parts of urea as the N source, 0.3 parts of $B_4Si$ as the Si source, and 10 parts of $LiSrBN_2$ as the synthesizing catalyst of CBN were treated under the same high-temperature and high-pressure conditions as in Example 8. Relatively blackish CBN particles with sharp edges could be obtained.

As is described hereinabove, the CBN abrasive grains according to the present invention have sharper edges than the conventional products and exhibit improved grinding performance as a grinding wheel which is required to have a high cutting quality.

The method according to the present invention results in the reliable production of CBN abrasive grains having sharp edges.

We claim:

1. A method for producing CBN particles comprising treating HBN under a high temperature and high pressure condition, wherein the method comprises mixing a C source, an Si source, and at least one member selected from the group consisting of an alkali metal hydride and an alkaline-earth metal hydride, as well as a synthesizing catalyst of CBN which may be the alkali metal hydride or the alkaline-earth metal hydride, together with said HBN and subjecting said mixture to the high temperature and high pressure treatment.

2. A method for producing CBN particles comprising treating HBN under a high temperature and high pressure condition, wherein the method comprises mixing a C source, an Si source, an alkali metal hydride or alkaline-earth metal hydride, and a synthesizing catalyst of CBN other than said alkali metal hydride or alkaline-earth metal hydride, together with said HBN and subjecting said mixture to the high temperature and high pressure treatment.

3. A method for producing CBN particles comprising treating HBN under a high temperature and high pressure condition, wherein the method comprises mixing a C source, an Si source, and one member selected from the group consisting of an alkali metal hydride, an alkaline-earth metal hydride, and a synthesizing catalyst of CBN other than said alkali metal hydride and said alkaline-earth metal hydride, with said HBN and subjecting said mixture to the high temperature and high pressure treatment.

4. A method for producing CBN particles, comprising treating HBN under a high temperature and high pressure condition, wherein the method comprises mixing a C source, an Si source, one or both of a member selected from the group consisting of an alkali metal hydride and an alkaline-earth metal hydride, and a synthesizing catalyst of CBN with said HBN and subjecting said mixture to the high pressure and high temperature treatment.

5. A method for producing CBN particles comprising treating HBN under a high temperature and high pressure condition, wherein the method comprises mixing an Si source, an alkali metal hydride or alkaline-earth metal hydride, and a synthesizing catalyst of CBN with said HBN and subjecting said mixture to the high pressure and high temperature treatment.

6. A method according to claim 1 or 2, wherein said HBN has of 95 % or more.

7. A method according to claim 3, 4 or 5, wherein said HBN has a purity of 95% or more.

8. A method according to claim 1 or 2, wherein said C source is at least one member selected from the group consisting of fatty acids, hydrocarbons, nitrogen-containing organic compounds, graphite, carbon black or $B_4C$.

9. A method according to claim 4, 5 or 6, wherein said C source is at least one member selected from the group consisting of fatty acids, hydrocarbons, nitrogen-containing organic compounds, graphite, carbon black or $B_4C$.

10. A method according to claim 8, wherein the amount of said carbon source used is from 0.01 to 15 % relative to the total weight of the mixture.

11. A method according to claim 9, wherein the amount of said carbon source used is from 0.01to 15 % relative to the total weight of the mixture.

12. A method according to claim 1 or 2, wherein said Si source is at least one member selected from the group consisting of $B_4Si$, $Si_3N_4$, and Si which may be contained in the synthesizing catalyst of CBN.

13. A method according to claim 4, 5 or 6, wherein said Si source is at least one member selected from the group consisting of $B_4Si$, $Si_3N_4$, and Si which may be contained in the synthesizing catalyst of CBN.

14. A method according to claim 12, wherein the amount of said Si source is from $10^{-5}$ to $10^{-2}$ mol relative to 1 mol of said HBN.

15. A method according to claim 13, wherein the amount of said Si source is from $10^{-5}$ to $10^{-2}$ mol relative to 1 mol of said HBN.

16. A method according to claim 1 or 2, wherein said alkali metal hydride is selected from the group consisting of lithium hydride and sodium hydride.

17. A method according to claim 3, 4 or 5, wherein said alkali metal hydride is selected from the group consisting of lithium hydride and sodium hydride.

18. A method according to claim 16, wherein the amount of said alkali metal hydride is from 0.1 to 10% relative to the total weight of the mixture.

19. A method according to claim 17, wherein the amount of said alkali hydride is from 0.1 to 10% relative to the total weight of the mixture.

20. A method according to claim 1 or 2, wherein said alkaline metal earth hydride is selected from the group consisting of calcium hydride and strontium hydride.

21. A method according to claim 3, 4 or 5, wherein said alkaline earth metal hydride is selected from the group consisting of calcium hydride and strontium hydride.

22. A method according to claim 20, wherein, the amount of said alkaline earth metal hydride is from 0.1 to 10% relative to the total weight of the mixture.

23. A method according to claim 21, wherein, the amount of said alkaline earth metal hydride is from 0.1 to 10% relative to the total weight of the mixture.

24. A method according to claim 1 or 2, wherein the mixture further contains an N-source.

25. A method according to claim 3, 4 or 5, wherein the mixture further contains an N-source.

26. A method according to claim 24, wherein said N-source is at least one member selected from the group consisting of melamine and urea.

27. A method according to claim 26, wherein the amount of said N-source is from 0.01 to 10 parts of the mixture.

28. A method according to claim 24, wherein the amount of said N-source is from 0.01 to 10 parts of the mixture.

29. A method according to claim 26, wherein the amount of said N-source is from 0.01 to 10 parts of the mixture.

30. A grinding wheel according to claim 28, wherein the CBN abrasive grains are coated with Ni and are bonded by a resin.

* * * * *

UNITED STATES PATENT AND TRADEMARK OFFICE
CERTIFICATE OF CORRECTION

PATENT NO. : 5,000,760

DATED : March 19, 1991

INVENTOR(S) : Hirohiko Ohtsubo; Masakazu Maki; Eiichi Iizuka

It is certified that error appears in the above-identified patent and that said Letters Patent is hereby corrected as shown below:

On the title page assignee should read;

-- [73] Assignee: Showa Denko K.K., Tokyo, Japan --.

Column 1, line 45, delete "$LiMBH_2$" and insert --$LiMBN_2$--.

Column 2, line 15, delete "according o to" and insert --according to--.

Column 3, line 7, delete "result that that" and insert --result that--.

Column 5, line 1, delete "$Ca_3BN_2$" and insert --$Ca_3BN_3$--.

Column 5, line 61, delete "C8N" and insert --CBN--.

Column 6, line 33, delete "Vitre-bond" and insert --Vitrified bond--.

UNITED STATES PATENT AND TRADEMARK OFFICE
CERTIFICATE OF CORRECTION

PATENT NO. : 5,000,760
DATED : March 19, 1991
INVENTOR(S) : Hirohiko Ohtsubo, Masakazu Maki; Eiichi Iizuka It is certified that error appears in the above-identified patent and that said Letters Patent is hereby corrected as shown below:

Column 6, lines 43 and 44, delete "205 mm$\phi$, 5 mm$\mu$, and 76.2mm H" and insert --205mm$\phi$ x 5mm U x 76.2mm H--.

Signed and Sealed this

First Day of December, 1992

Attest:

DOUGLAS B. COMER

Attesting Officer

Acting Commissioner of Patents and Trademarks